Nov. 28, 1950     L. ZICKRICK     2,532,265
THERMAL OVERLOAD PROTECTIVE RELAY USING INDIUM
Filed Jan. 19, 1949
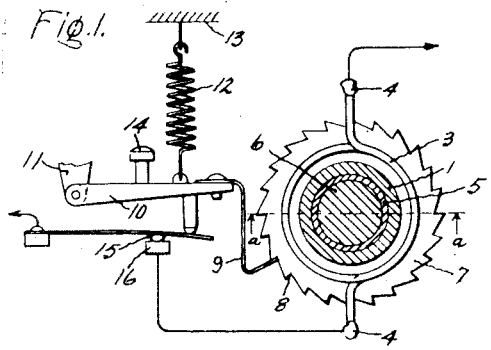
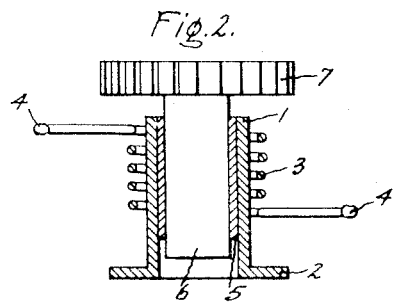
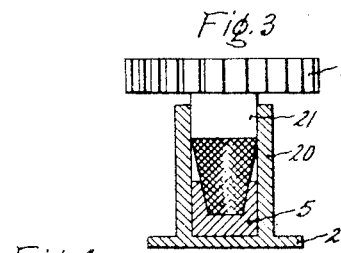
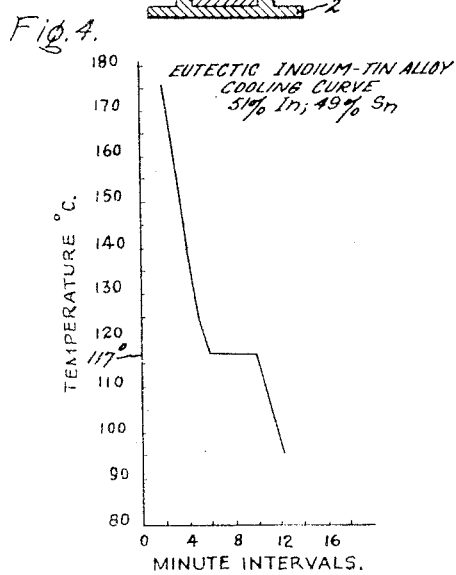
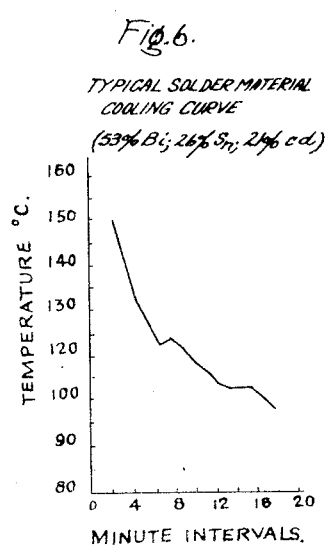
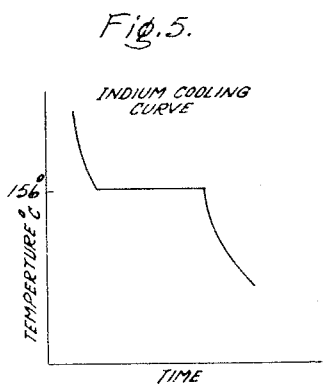
Inventor
Lyall Zickrick,
by Claude H. Mott.
His Attorney.

Patented Nov. 28, 1950

2,532,265

UNITED STATES PATENT OFFICE 2,532,265

THERMAL OVERLOAD PROTECTIVE RELAY USING INDIUM

Lyall Zickrick, Schenectady, N. Y., assignor to General Electric Company, a corporation of New York Application January 19, 1949, Serial No. 71,724

7 Claims. (Cl. 200—124)

This invention relates to thermal overload protective relays, and more particularly to fusible, self-soldering overload relays of the solder film or solder pot type.

In the past, objections have arisen when such solder controlled relays are used for thermal overload protection because the low temperature fusible materials or solders are of conglomerate chemical materials without a definite melting point. When melting, these solders have a melting range rather than a melting point, and upon solidfying, the solders have a mushy stage due to the freezing range of the solders rather than a freezing point.

In a solder controlled relay where ordinary solders are used, it is found that the length of time the heat is applied may well be a determining factor in releasing the relay before an exact temperature, at which overload is calculated to occur, is reached. This is because the heat built up in the solder reaches the point at which the solder enters the mushy stage. Under these conditions premature release of the relay often occurs before the desired temperature is reached.

Similarly complaints have arisen because of the mushy stage the solder goes through when it is solidifying. If a shock, jar, or vibration of the element being frozen in place by the solder occurs during the mushy period, the element tends to ream a hole in the solder, rather than to stick to the solder and be set firmly in place by it. Such a movement frequently occurs in the event a user of a relay attempts to reset the relay too soon after overload and while the solder is in the mushy stage prior to solidification. Under these circumstances, when the solder solidifies, the relay cannot be reset without reheating the solder. If, as is usually the case, the protective relay is in series with the main current line, considerable delay is entailed before the solder can be remelted by heat from an outside source, so that it will grasp the control element and permit the circuit to be used again.

To overcome these objections, it is desirable that a solder or fusible bonding material be used which has a sharp melting point and a sharp freezing point at a useful temperature. If such a material is utilized, the heat present can be utilized for overload protection purposes at a close and accurate temperature point. Also the quick freezing and grasping of a solder with these characteristics will prevent the reaming of a hole in the solder when vibrations and jars or too rapid reset of the relay occurs.

It is an object of my invention to provide a new and improved thermal-responsive device of the self-soldering type which is fast acting and dependable yet which is rugged and inexpensive.

A further object of my invention is to provide a new and improved thermal relay of the self-soldering type which is quick-acting and dependable, and which is not subject to loosening of the solder due to shock or resetting operation while the solder is cooling.

In order to achieve these objects and successfully accomplish my purposes, I provide, in a self-soldering thermal responsive relay, a fusible bonding material or solder formed wholly or primarily of the class of materials consisting of the element indium and indium eutectic alloys. A better understanding of my invention can be had by referring to the accompanying drawing in which Fig. 1 is a partially schematic diagram of a self-soldering thermal responsive relay embodying my invention, the thermal responsive element being shown in cross section; Fig. 2 is a cross-sectional view of the thermal element taken along line a—a of Fig. 1; Fig. 3 is a cross-sectional view of another form of thermal element embodying my invention; and Figs. 4, 5 and 6 are the cooling curves, respectively, of the eutectic indium-tin alloy, pure indium, and ordinary solder. Similar elements in each figure have been given identical numbers.

Referring now to the drawing, and in particular to Figs. 1 and 2, I provide in accordance with one embodiment of my invention a hollow thermally conducting base member formed as an open-ended cylinder 1. The base member 1 is equipped with a flange 2, so that it may be conveniently attached to a support for the relay device. Wound around the base member 1 is a heater coil 3 of any suitable resistance material. The heater coil 3 may be provided with terminals 4 so that it is freely removable by disconnection at said terminals and therefore heaters of different wire sizes and resistances can be used. In this manner electrical devices of different current capacities can be protected by the same relay by merely changing the heater coil 3. If better thermal transfer is desired, the heater 3 may be wound directly around the base member 1 so that heat is conveyed by induction to a fusible soldering material 5 within the cylinder 1, it being understood that, in such case, the turns of the heater wire 3 are insulated, as by varnish or the like.

Telescoped within and coaxial with the base member 1, is a cylindrical movable member 6. The diameter of the member 6 is slightly less than the inside diameter of the base member 1, and the thin film 5 of fusible material lies between members 1 and 6. However, in the form of the invention shown in Figs. 1 and 2, the diameter of the member 6 must be large enough to allow only a solder film between the members 1 and 6 which is thin enough to be held in place by the surface tension of the fusible material when said material is in the melted state.

The fusible material 5 is composed of pure indium or it may be composed of an indium eutectic alloy, especially the eutectic indium-tin alloy of approximately 51% indium and 49% tin. Both the pure element and its eutectic alloy with tin have the properties of a sharp melting point and a sharp freezing point. The pure indium has a sharp melting and freezing point at approximately 156° C., a temperature generally satisfactory for electric overload protective devices. It is highly corrosion resistant, and is stable in that it does not oxidize to any appreciable extent when heated to its melting temperature. Indium in solid form is soft and ductile. It also wets well of itself without the addition of a flux of any kind. The eutectic indium-tin alloy of 51% indium and 49% tin has all the same qualities necessary for a satisfactory bonding material but has its sharp change of state at 117° C.

Referring briefly to Figs. 4, 5 and 6, where Fig. 4 is the cooling curve of the eutectic indium-tin alloy, Fig. 5 is the cooling curve of pure indium, and Fig. 6 is the cooling curve of a typical solder material (composed approximately of 53% Bi, 26% Sn, and 21% Cd), the difference in sharpness of the melting and freezing points respectively of the pure metal solder, of the eutectic alloy solder, and of ordinary solder is graphically illustrated.

As illustrated in Fig. 1, which shows a preferred embodiment of my invention, the movable member 6 is connected at one end to a ratchet wheel 7 having teeth 8 around its periphery. The teeth 8 are arranged to engage and hold in place a pawl 9 which is mounted on a lever arm 10 which, in turn, is pivotally attached to a support 11. A tension spring 12 is attached at one of its ends to the arm 10 to bias it and the pawl 9 so that the pawl 9 will exert a turning force against the ratchet wheel 7 whenever the pawl 9 is engaged firmly by the teeth 8. The spring 12 is attached at its other end to a fixed support 13.

The spring 12 biases the arm 10 and the pawl 9 so that the pawl 9 will turn the movable member 6 when solder material 5 melts. When the member 6 turns, the pawl 9 slips from engagement with the teeth 8, and remains free from the teeth 8 until reengaged as by pressure upon a button 14 which is mounted on the arm 10 to permit manual reengagement of the pawl 9 and the teeth 8.

When the pawl 9 is engaged with the teeth 8, the arm 10 insures that a good contact will be made between a movable contact 15, associated with the arm 10, and a fixed contact 16. Contacts 15, 16 are in series circuit relation with the heater current supply and with the current supply of the electrical device (not shown) to be protected. The contacts 15, 16 are normally closed whenever the pawl 9 is engaged with the teeth 8, but the contacts separate, thereby breaking the main current supply circuit to the device to be protected and to the heater, upon disengagement of the pawl 9 from the teeth 8 when the solder 5 melts, thereby allowing the member 6 to turn.

Now referring to Fig. 3, I provide a solder pot type of overload relay having a cup-shaped base member 20 of thermal conducting material. The member 20 is equipped with a base flange 2 so that the relay may be attached to any convenient support. A heater element (not shown) is provided surrounding the member 20 similar to the heater coil 3 described above.

Within the cup-shaped member 20 is placed the solder material 5 of indium or a eutectic indium alloy as previously described. Also within the cylinder 20 is a rotatable conical member 21. The movable member 21 fits closely but loosely at its upper end near the mouth of the cup 20, so that the surface tension of the bonding material 5 will prevent the material from running out if the relay is mounted in an inverted position. The movable member 21 may be smooth, but is preferably knurled, and extends into a pool of the solder 5 within the base 20 where it is held firmly in place by the solder material 5 when it is solid. The member 21 is connected at its upper end to a ratchet 7, which engages a pawl mechanism, as was previously described in the description of Figs. 1 and 2.

When a circuit breaker of the illustrated type is connected to protect an electrical device, the solder remains solid until a temperature rise caused by an overload in said device increases the current in the heater coil 3 to a temperature equal to the heat of fusion of the metal or alloy. At this temperature, the solder swiftly melts and the pressure exerted by the spring 12 against the arm 10 and the pawl 9 causes the pawl 9 to turn the ratchet wheel 7 and the cylinder 6 (or 21) to which it is attached. When the ratchet 7 turns, the pawl 9 is released from its engagement with the teeth 8, and the arm 10 moves to allow the movable contact 15 to break the circuit to the heater, and to the electrical device being protected, at contacts 15, 16. When the heater cools, the solder quickly solidifies as its temperature drops to its freezing temperature, and the latch 9 may then be reengaged with teeth 8 by pressure on button 14, thereby again closing contacts 15, 16.

While I have shown only certain preferred embodiments of my invention by way of illustration, many modifications will occur to those skilled in the art and I, therefore, wish to have it understood that I intend in the appended claims to cover all such modifications as fall within the true spirit and scope of my invention.

What I claim as new and desire to secure by Letters Patent of the United States is:

1. A thermal overload protective device for electrical apparatus comprising, a pair of coaxially disposed relatively movable members positioned in closely spaced relation, a fusible bond held between said members by surface tension when fused for holding said members in stationary relationship with each other, said bond being formed of a material of the class consisting of indium and indium eutectic alloys which are self-wetting and have a sharp melting point at a useful temperature not exceeding 160° C., and means responsive to the current through said electrical apparatus for heating said bond.

2. A thermal overload protective device for electrical apparatus comprising, a first member having a cylindrical opening therein, a second member having a portion provided with a cylindrical outer surface of slightly smaller diameter than the opening in said first member, said portion of said second member being coaxially positioned within the opening said first member forming a bond receiving gap therebetween, a fusible bond held between said members by surface tension when fused for holding said members in stationary relationship with each other, said bond being formed of a material of the class consisting of indium and indium eutectic alloys which are self-wetting and have a sharp melting point at a useful temperature not exceeding 160° C., means biasing one of said members for relative movement with respect to the other and means responsive to the current through said electrical apparatus for heating said bond thereby to release said biased member for movement at the sharp melting point of said bonding material.

3. A thermal overload protective device for electrical apparatus comprising, a pair of coaxially disposed relatively movable members positioned in closely spaced relation, a fusible bond held between said members by surface tension when fused for holding said members in stationary relationship with each other, said bond being formed of an alloy material composed approximately of 51% indium and 49% tin, said indium tin alloy being self-wetting and having a sharp melting and freezing point at approximately 117° C., means biasing one of said members for relative movement with respect to the other, and means responsive to the current through said electrical apparatus for heating said bond thereby to release said biased member for movement at the sharp melting point of said bonding material.

4. A thermal overload protective device for electrical apparatus comprising, a pair of coaxially disposed relatively movable members positioned in closely spaced relation, a fusible bonding material held between said members by surface tension when fused for holding said members in stationary relationship with each other, said bond consisting solely of indium thereby to provide a sharp change from solid to liquid state at approximately 160° C., means biasing one of said members for relative movement with respect to the other, and means responsive to the current through said electrical apparatus for heating said indium bond thereby to release said biased member for movement at the sharp melting point of said indium.

5. A self-soldering circuit breaker for an electric circuit comprising, a first hollow cylinder, a second cylinder telescopically arranged within said first cylinder, a fusible bond between said cylinders for holding said cylinders in stationary relationship with each other, said bond being formed principally of indium and having a sharp melting point at a useful temperature of approximately 110° to 160° C., the bonding material being held between said cylinders by surface tension after being fused, means biasing one of said cylinders for relative movement with respect to the other, and means responsive to the current through said electrical circuit for heating said indium thereby to release said biased cylinder for movement at the sharp melting point of said bonding material.

6. A self-soldering circuit breaker for an electric circuit comprising, a first hollow cylinder, a second cylinder telescopically arranged within said first cylinder, a fusible indium-tin alloy bond between said cylinders for holding said cylinders in stationary relationship with each other, said indium tin alloy being composed approximately of 51% indium and 49% tin and having a sharp melting and freezing point at approximately 117° C., means responsive to the current through said electrical circuit for heating said alloy, and means for changing the relative position of one of said cylinders with respect to the other at the sharp melting point of said alloy when the current through said electrical circuit exceeds a predetermined value.

7. A thermal overload protective device for electric apparatus comprising, a first cylinder of thermal conducting material, a second cylinder telescopically arranged for relative movement within said first cylinder, a fusible bonding material positioned between said two cylinders to hold said cylinders in stationary relationship with each other, said material being of a class consisting of indium and indium eutectic alloys which have a sharp melting point at a useful temperature not exceeding 160° C., said bonding material being held between said two cylinders by surface tension when fused, a heater having insulated turns placed in direct thermal contact with said thermal conducting first cylinder and responsive to the current through said apparatus, thereby to transfer heat by conduction to said fusible bonding material, and means for changing the relative position of said second cylinder within said first cylinder at the sharp melting point of said bonding material responsively to the flow of a predetermined current through said apparatus.

LYALL ZICKRICK.

REFERENCES CITED

The following references are of record in the file of this patent:

UNITED STATES PATENTS

| Number | Name | Date |
|---|---|---|
| 1,652,230 | Besag | Dec. 13, 1927 |
| 1,755,231 | Van Valkenburg | Apr. 22, 1930 |
| 2,235,634 | Hensel et al. | Mar. 18, 1941 |

FOREIGN PATENTS

| Number | Country | Date |
|---|---|---|
| 277,021 | Great Britain | May 17, 1928 |

OTHER REFERENCES

Article: "The Binary Alloys of Indium and Tin," pages 229–241, vol. 88, Transactions of the Electrochemical Society (1945). Copy in Div. 56.

Certificate of Correction

Patent No. 2,532,265  November 28, 1950

LYALL ZICKRICK

It is hereby certified that error appears in the printed specification of the above numbered patent requiring correction as follows:

Column 2, line 50, for the word "induction" read *conduction*; column 3, line 69, for "of" read *to*;

and that the said Letters Patent should be read as corrected above, so that the same may conform to the record of the case in the Patent Office.

Signed and sealed this 13th day of March, A. D. 1951.

[SEAL]

THOMAS F. MURPHY,
*Assistant Commissioner of Patents.*